June 6, 1967  A. L. NIXON  3,323,715
DATA PROCESSING MEANS HAVING STORAGE CIRCUITS
Filed Oct. 28, 1964  7 Sheets-Sheet 1

INVENTOR.
ALBERT L. NIXON
BY
Newton, Hopkins & Jones
ATTORNEYS

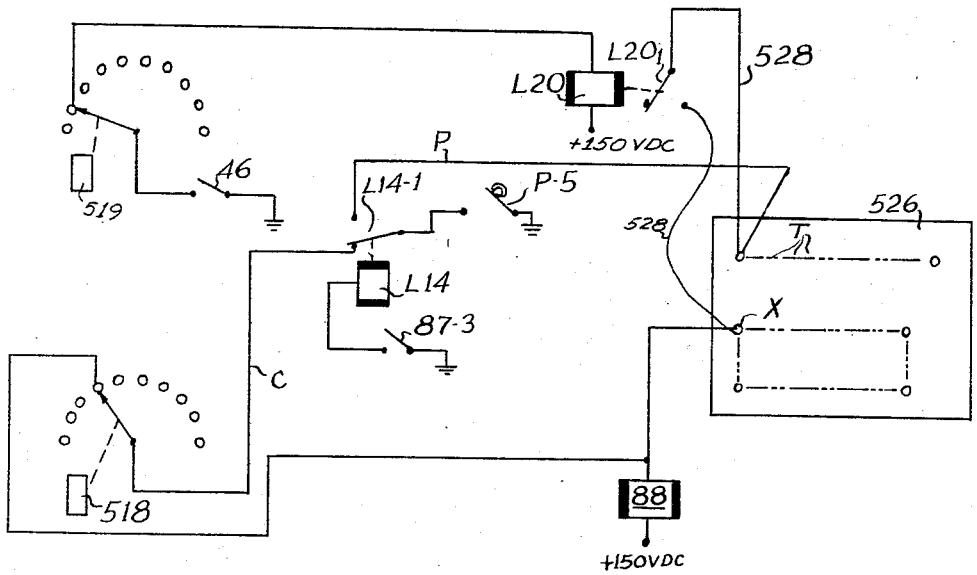
Fig 3
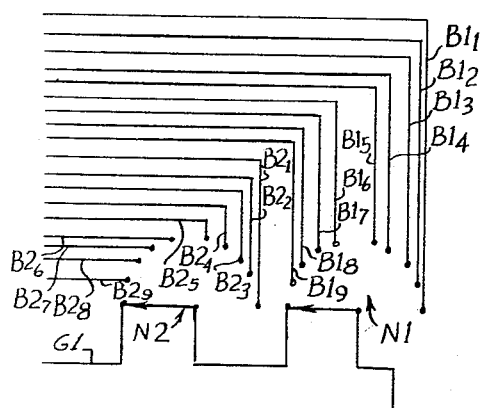
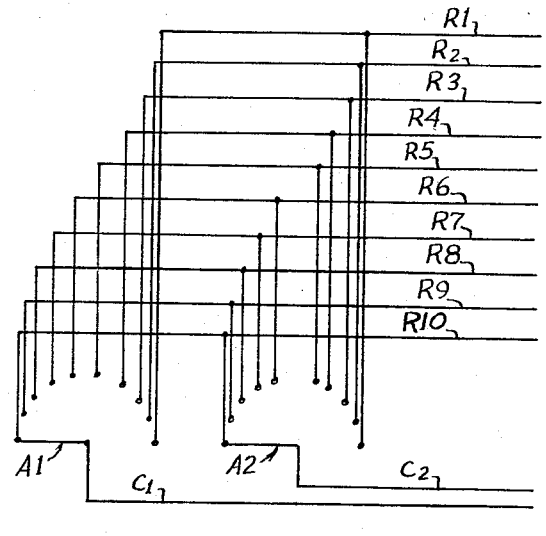
Fig 4
INVENTOR.
ALBERT L. NIXON
BY
Newton, Hopkins & Jones
ATTORNEYS June 6, 1967

A. L. NIXON 3,323,715

DATA PROCESSING MEANS HAVING STORAGE CIRCUITS

Filed Oct. 28, 1964

INVENTOR.
ALBERT L. NIXON

BY
Newton, Hopkins & Jones

ATTORNEYS

June 6, 1967

A. L. NIXON 3,323,715

DATA PROCESSING MEANS HAVING STORAGE CIRCUITS

Filed Oct. 28, 1964

INVENTOR.
ALBERT L. NIXON
BY
Newton, Hopkins & Jones
ATTORNEYS

United States Patent Office 3,323,715
Patented June 6, 1967

3,323,715
DATA PROCESSING MEANS HAVING STORAGE CIRCUITS
Albert L. Nixon, 3827 Commander Drive,
Chamblee, Ga. 30005
Filed Oct. 28, 1964, Ser. No. 406,994
9 Claims. (Cl. 234—16)

This invention relates to electronic data processing and apparatus, and is more particularly concerned with data processing means having storage circuits.

In many businesses, there is certain information that is used repeatedly, such as identification of products or customers. With the current very prevalent use of electronic processing for various records, various data frequently must be put into the form of a punched card or the like; and, it is a very laborious and time consuming process to compute the various data, and to put the results of the data along with such identifying code into a punched card; and, it is especially time consuming to punch repetitive data each time a certain product or customer or the like must be identified.

Though some of the larger electronic computers which have storage circuits can store the various data and spew forth the required characters at the required time, there are many instances in which the company involved does not have access to such a computer due to the very large price of purchasing or renting such a computer. Also, card punching machines can duplicate material from other cards; however, in duplicating a card, the original card must be run such a large number of times that it will wear out and give improper reading, or the card will become so mutilated that it will not feed through the machine.

The device of the present invention overcomes the above mentioned and other difficulties by providing a very simple, and relatively inexpensive, device that has storage circuits without requiring the storage to be in punched cards, punched tapes or the like. The apparatus is so arranged that the card being punched can have both numeric and alpha fields, and the punching can be done simultaneously with computation concerning a certain account; the apparatus is controlled from the keyboard of a business machine such as an adding machine.

The present invention makes use of the device disclosed in the copending application of the same inventor, entitled, "Data Coupling Device," Ser. No. 200,851, filed June 7, 1962, now Patent No. 3,197,743 so that application should be read in conjunction with the present application.

Briefly, the device of the present invention, includes four major components; namely, a wired adding machine (sometimes termed an adder), a card punching machine (sometimes termed a key punch), an explosion unit containing storage circuitry therein wired between the adder and the key punch, and a data coupler wired between the explosion unit and the key punch. By using the data coupler in conjunction with the explosion unit, all of the advantages such as indication of error, duplication and marking of erroneous cards for automatic rejection are retained, while the explosion unit allows stored information to be fed into the key punch and thereby reduce the amount of manual labor involved in punching cards with repititious material.

Programming the invention is readily and easily accomplished through a manipulation of manual switches readily available on the data coupler, the installation of suitable programming cards in the keypunch, and properly programming the designed repititious material into the plug board of the explosion unit.

Other objects, features and advantages of the present invention will become apparent from the following description when taken in conjunction with the accompanying drawing wherein like characters of reference designate corresponding parts throughout the several views and wherein:

FIG. 3 is a schematic wiring diagram for showing the basic operation of the present invention.

FIG. 4 is a wiring diagram of a portion of the adder of the invention.

Figure 1:
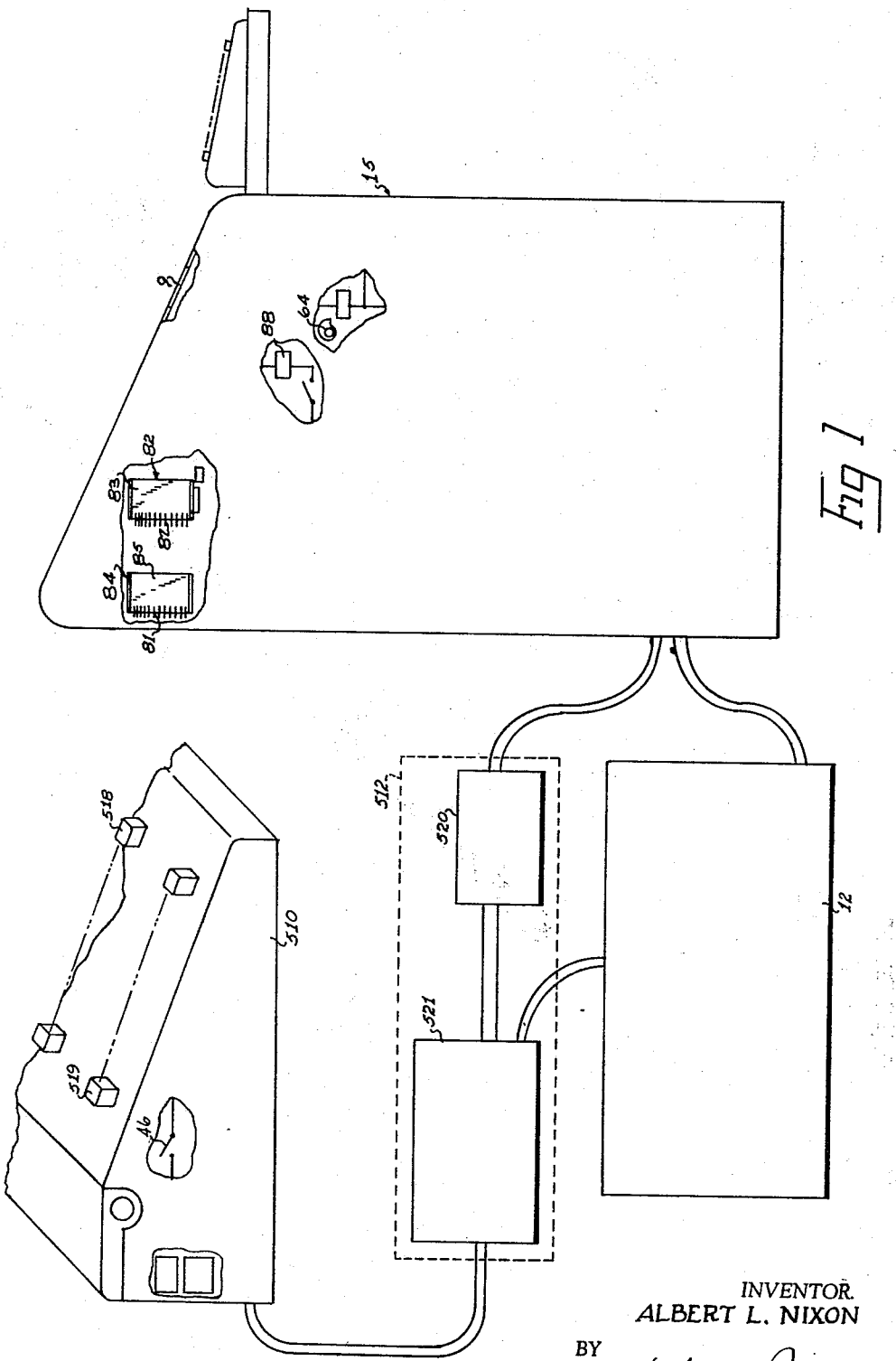
FIG. 1 is a view showing the arrangement of the components of a system constructed in accordance with the present invention, showing the components included in the system and cables connecting them.

The following specification discloses a specific embodiment of the invention, however, the invention is not limited to the details disclosed herein since the invention may be embodied in other equivalent forms.

In the interest of clarity, those common components of this application and the above identified co-pending application of the same inventor will retain the reference numerals used for these common components in the co-pending application. For example, the keypunch of this application will be designated by the numeral 15 and the data coupler in this application will be designated by the numeral 12.

Referring now in detail to the embodiment chosen for the purpose of illustrating the present invention, the numeral 510 denotes generally the added as best seen in FIG. 1, which is connected by cable 511 to the explosion unit 512. A cable 514 leads from the explosion unit 512 to the key punch 15 and a cable 515 leads from the data coupler 12 to the key punch 15. Connecting the explosion unit 512 and the data coupler 12 is a cable 516.

The adder 510 contains two groups of keys on its keyboard; the keys of one group, being designated by the numeral 518, allow the operator to manually insert information into the adder 510 and thence into the key punch 15 and the keys of the second group, designated by the numeral 519, allow the operator to select stored information from the explosion unit 512 and transpose it therefrom into the key punch 15. A group of switches A1–9 are associated with the keys 518 and a group of switches N1–5 are associated with the keys 519. The switches A1–9 are wired parallel to the wires R1–10 with the wires C1–9 connected to the common point of the switches A1–9. The keys 518 and their associated switches A1–9 define a commutator 86 as in the co-pending application of the same inventor. The switches N1–5 are wired in series with the common point of the switches N2–5 being wired to the first point of the next lowest numbered switch. This means that the common point of N2 is wired to the first point of N1. Wires $B1_{1-9}$ connect the points of the switch N1 to the explosion unit 512 and wires $B2_{1-9}$ connect the points of the switch N2 into the explosion unit 512. The keys 519 and their associated switches N1–5 define a code selector 517. Thus, all of the switches A1–9 associated with the keys 518 are identical and all of the switches N1–5 associated with the keys 519 are identical. Therefore, for simplicity, only two of the switches A1–9 are indicated and two of the switches N1–5 are indicated. It is then understood that the switches A3–9 and N3–5 are connected respectively to the explosion unit 512 in the same manner as the switches A1–2 and the switches N1–2. A motor bar switch 17 is associated with each of the keys 519 so that the adder 510 is cycled through closure of the switch 17 each time a key 519 is depressed. A motor bar 17 is also provided which has an associated switch 17 for cycling the adder 510.

Figure 2:
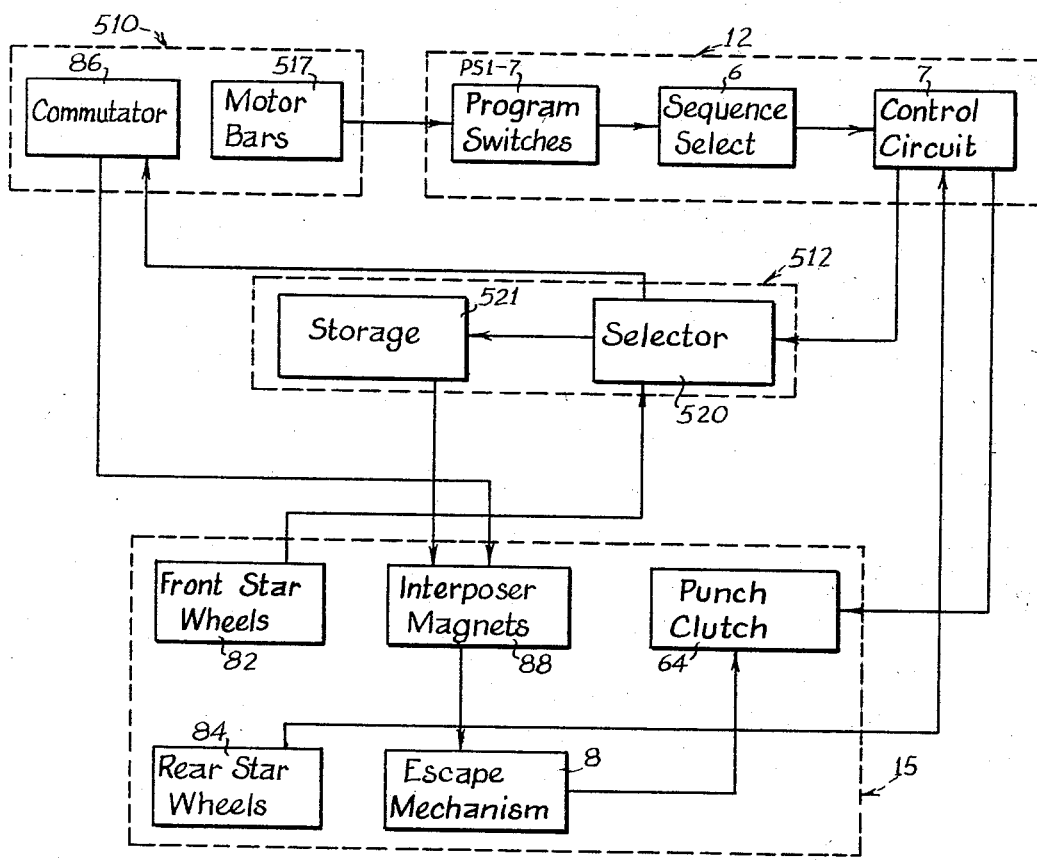
FIG. 2 is a block diagram illustrating the operation of the system shown in FIG. 1.

As seen in FIG. 2, one of the motor bar switches 17, cycles the adder 510 and causes the record switch 46 to close which sends a signal to the data coupler 12 in the same manner in which the record switch closed by the motor bar of the co-pending application sends a signal to the data coupler. Thus, a signal is sent to the sequence selector 6 through the switches PS1–7 and thence to the control circuit 7. The signal emitted by the starwheels 81 associated with the rear program drum 84 is fed to the control circuit 7 which then transmits a signal to the selector 520 of the explosion unit 512. A signal from the starwheels 87 associated with the front program drum 82 is fed to the selector 520 of the explosion unit 512 and thereby causes the selector 520 to send a signal to either the storage unit 521 of the explosion unit 512 or to the commutator 86. If the signal is sent from the selector 520 to the storage unit 521, a signal, selected in storage by a signal from the code selector 517 by a key 519, is transmitted to the interposer magnets 88 for their activation. If, on the other hand, the signal is sent from the selector 520 to the commutator 86, a signal, selected by a key 518 of the commutator 86, is sent from the commutator 86 to the interposer magnets 88 for their activation. A signal from the interposer magnets 88 is transmitted to the escape mechanism 8 and to the punch clutch 64 in the same manner as in the co-pending application of the same inventor. The interposer magnets 88, when activated, cause a card 9 to be punched in the conventional manner.

The circuits of the invention are shown with the relay coils and their associated switches separated for simplicity and clarity, as is common in the art, with the switches being shown in their normal position. Current is assumed to flow herein from low to high potential. It will be understood that the drawings indicate a number of relays, each having a coil which controls one or more associated switches. I have designated a coil of a particular relay by the letter L and a number and the switches associated with that coil by the letter L and the number designation of the controlling coil followed by a suffix. Thus, coil L10 controls switches L10$_1$, L10$_2$, L10$_3$ etc.

In order that the invention may be better understood, only those components of the data coupler 12 are shown which are necessary for the operation of the explosion unit 512. It should be understood, however, that, although not shown, the invention retains all of the error indications and lock functions as explained in the co-pending application of the same inventor since the same data coupler as described in the co-pending application is used here.

For an explanation of the basic circuit involved with each of the keys of the adder 510, attention is directed to FIG. 3 of the drawings which shows a very simpliged form of the circuit of the invention. The circuit shown in FIG. 3 shows one key 518 and its associated switch A, one key 519 and its associated switch N, a selector relay coil L14 and its associated switch L14$_1$ used to select either manually imposed or stored information to be fed into the interposer magnets 88, one of a plurality of storage relays L20 and its associated switch L20$_1$ used in the storage unit 521 of the invention, a plug board 526 used in the storage unit 521 of the invention and the interposer magnets 88 associated with the circuit of each key 518 or 519.

When it is desired that the storage unit 521 is to be used to select stored information therefrom, a switch 87–3 of the starwheel 87 is closed by an appropriate hole in a card 83 on the program drum 82. This energizes the relay coil L14 from a +150 v. DC source available in the key punch 15. When the relay coil L14 is energized, its associated switch L14$_2$ is closed and completes a circuit from the switch P5 to the terminals T1–14 of the plugboard 526. This serves to place the terminals T1–14 at ground potential when the switch P5 is closed by cam 64.

When the designated key 519 is depressed, the adder 510 cycles and momentarily closes the record switch 46. This completes a circuit from ground through the switch N and its associated relay L20 to the +150 v. DC source thus energizing the relay coil L20. When the coil L20 is energized, a switch L20$_1$ is transferred which connects the terminals T to another selected terminal X through the wire RC and the plugwire 528. This serves to connect the interposer magnet 88 to ground through the wire D and the above described circuit when the switch P5 is closed and causes a card 9 to be punched in the keypunch 15.

When it is desired that information from the keys 518 be fed into the keypunch 15 the switch 87–3 is not closed since the starwheel 87 does not engageg a hole in the card 83 on the program drum 82. Thus, relay coil L14 is not energized and its associated switch L14$_2$ is in its normal position. This serves to connect the common point of the switch A to ground through wire C when switch P5 is closed. Thus, when a selected key 518 is depressed and the adder 510 is cycled to close switch 46, one side of the interposer magnet 88 is connected to ground through the wire R and the switch P5. This energizes the interposer magnet 88, since the other side of the magnet 88 is connected to a +150 v. DC source, and causes the cardcard 9 in the keypunch 15 to be punched.

In operation, the invention is used to first feed stored information into the keypunch 15 and after this information has been punched into card 9, to secondly feed manually imposed information into the keypunch 15 to be punched into the card 9. In order to do this the keys 518 are selected and depressed, and then the selected key 519 is depressed which causes the adder 510 to cycle. During the cycling of the adder 510, the card 83 on the program drum 82 closes the switch 87–3 and causes the stored information to be punched into the card 9 and then opens the switch 87–3 so that the relay coil L14 is de-energized to allow the manually imposed information to be fed into the keypunch 15 to be punched into the card 9.

Figure 5:
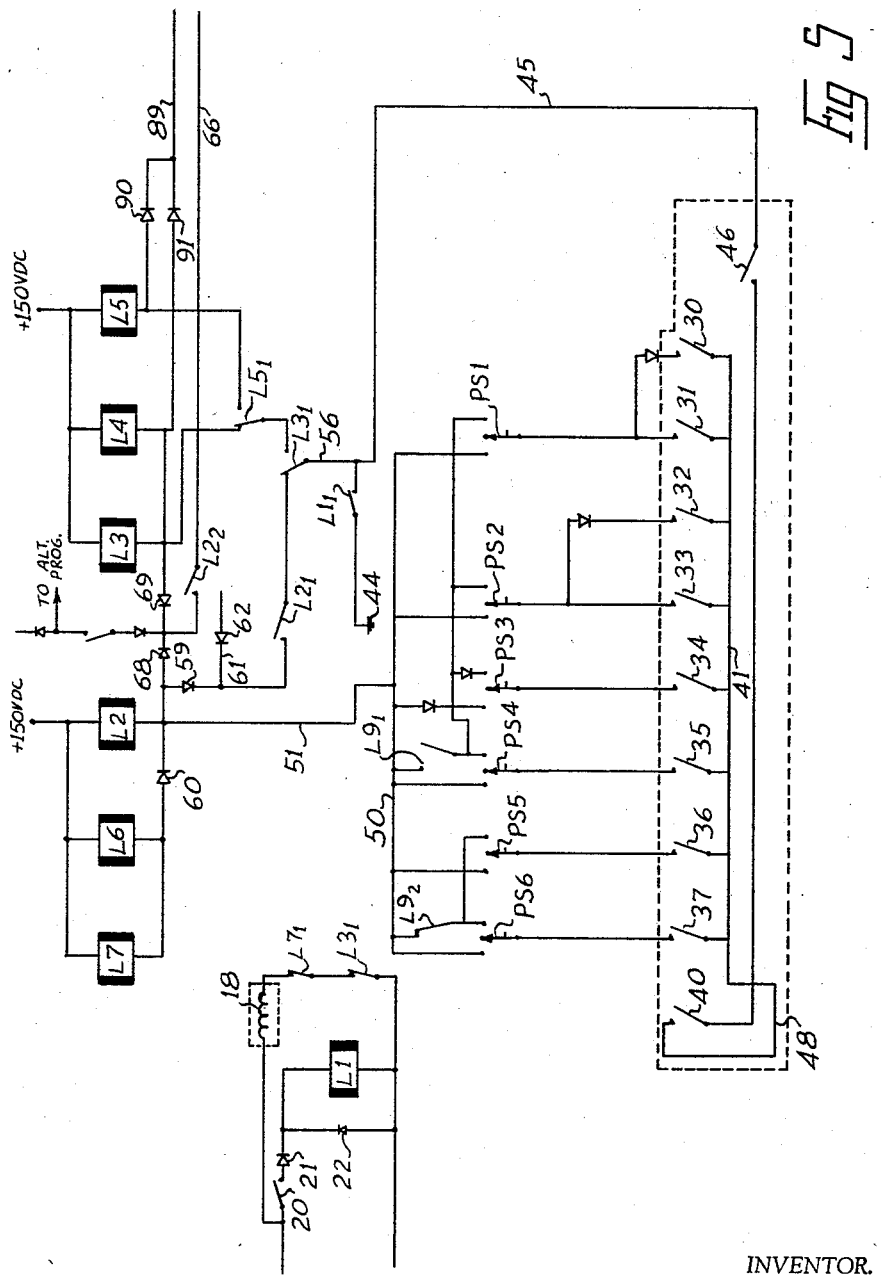
FIG. 5 is a wiring diagram showing an interconnection between the explosion unit and the data coupler of the invention.
Figure 6:
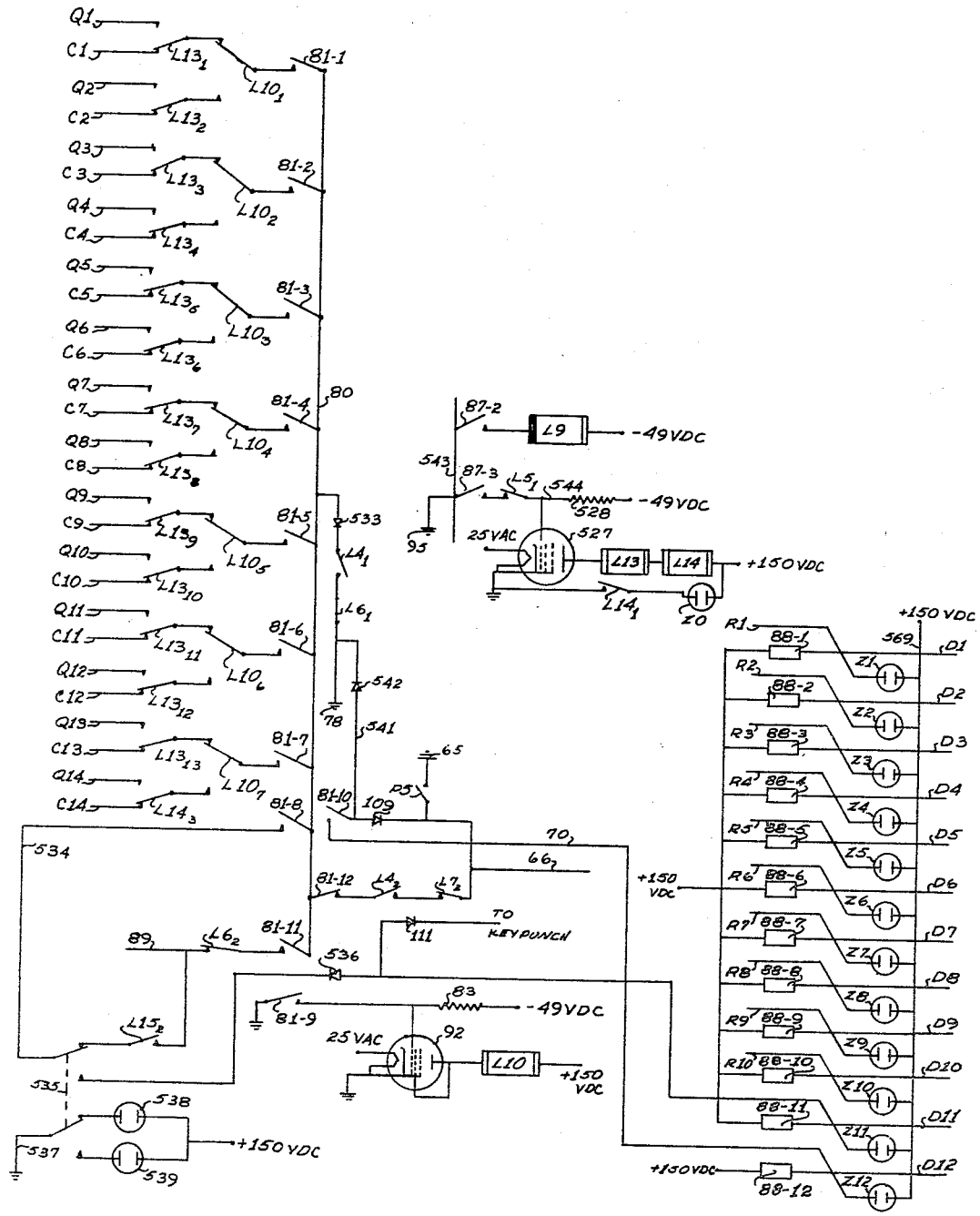
FIG. 6 is a wiring diagram showing the selection mechanism and the read out light circuit of the invention.

Referring now to the circuitry of the invention in detail, FIG. 5 of the drawings shows a manual on-off switch 20 in the line leading from a voltage source of 110 v. AC, standard voltage in an adder 510. A relay coil L1 is in parallel with the voltage source and in series with a diode 21 which gives half wave rectification to the alternating current of the voltage source. A second diode 22 in parallel with relay coil L1 is oriented so that the back E.M.F. due to the collapse of the magnetic field in the relay coil L1 will flow in the same direction as the current flowing through the half-wave rectifier. It will thus be seen that the back E.M.F. due to the collapse of the magnetic field will hold the relay coil L1 for a short while. The extra holding time is sufficient to prevent chattering of the relay coil L1 due to the pulsating current caused by the half-wave rectifier 21.

The on-off switch 20 allows the operation of the entire circuit, which is to be described hereinafter. It is only through the control circuit that the adder 510 and the keypunch 15 are interconnected; therefore, when the switch 20 is off, the adder 510 and/or the keypunch 15 may be operated individually, neither affecting the other in any way. The keys 519 of the adder 510 form a live keyboard of the adder 510, each having a motor bar switch 17 associated therewith. Therefore, when one of the keys 519 is depressed it serves as a motor bar and cycles the adder 510. This is done through a solenoid 18 which serves to lock the keyboard when the motor bar switch 17 associated with one of the keys 519 is closed. A wire 24 connects the solenoid 18 to the 110 v. AC source through a plurality of relay switches L7$_1$ and L3$_1$ connected in series and normally closed.

In programming of the present invention, switches PS1–6 are manipulated on the panel of the data coupler 12 in the same manner as described in the co-pending application of the same inventor.

The common poles of switches PS1–6 are connected through function designating switches 30–37 of the adder 510 to a common bus 41 as described in the co-pending application of the same inventor. The switches 30–37 and a switch 40 are closed when the adder 510 is cycled, the switch 40 grounding the common bus 41 through a wire 45 connected to the record switch 46 and a switch L1$_1$ to ground 44.

The switches 31–37 are connected, respectively to the common points of the switches PS1–6 through the wires 501, 502, 503, 504, 505, 506, and 507 and the switch 30 is connected to the wire 501.

One point of each of the programming switches PS1–6 is directly connected to a common bus 50; and, from bus 50 a wire 51 is connected to a relay coil L2, and to relay coils L6 and L7 through diode 60. The other side of the coils L2, L6 and L7 is connected to a high potential of a +150 v. DC available from the keypunch 15. A second point of each of the programming switches PS1–4 is connected to the common point of relay switch L9$_1$; while, a second point of each of the switches PS5–6 is connected to the common point of the relay switch L9$_2$. The normal point of switch L9$_1$ and the transfer point of switch L9$_2$ are connected to the keyboard locking mechanism of the data coupler 12 as disclosed in the co-pending application of the same inventor. The transfer point of switch L9$_1$ and the normal point of switch L9$_2$ are connected to the common bus 50. A signal received from the function designating switches 30–37 will be transmitted to the coil L2 through the wire 51.

Since the signal is transmitted through the wire 51 to relay coils L2, L6 and L7 only while the record switch 46 is closed, a holding circuit through switches L3$_1$ and L2$_1$ is provided to hold the picked coils L2, L6 and L7 after the adder 510 has cycled and the record switch 46 is once again open. Therefore, once coils L2, L6 and L7 are picked by a signal through the wire 51, the switch L2$_1$ closes and holds the coils L2, L6 and L7 through the wire 58, the switch L3$_1$ in its normal position, the wire 56, and the switch L1$_1$ to ground. This holding circuit is identical to the holding circuit used in the data coupler 12 in the co-pending application of the same inventor.

The switches 81–1 to 81–7 have a common bus 80 connected to their common points which is connected to ground 78 through a diode 533, a normally open switch L4$_1$ and a normally closed switch L6$_1$ as disclosed in the co-pending application. A switch 81–8 connected at its common point to common bus 80 is connected at its transfer point through wire 534 to one of the common points of a double pole, double throw switch 535 which is manually operated. The first and second transfer points of the switch 535 are associated with that common point connected to the wire 534. The first transfer point of the switch 535 is connected to the relay coil L5 through the switch L15$_2$ and the diode 90. The first transfer point of the switch 535 is also connected to the relay coils L3 and L4 through the switch L15$_2$ and the diode 91. The second transfer point of the switch 535 is connected to the interposer magnet 88–11 through a diode 356. Thus, when the common point of the switch 535 connected to the wire 534 contacts the first transfer point of the switch 535, the relay coils L3, L4 and L5 are energized through the switch L15$_2$, in its transfer position, when the switch 81–8 is closed. It will also be seen that when the common point of the switch 535 connected to the wire 534 contacts the second transfer point, that closure of the switch 81–8 will energize the interposer magnet 88–11. The other common point of the switch 535 is connected to ground through the wire 537 and has associated therewith third and fourth transfer points with the third transfer point being connected to a +150 v. DC source through a neon tube 538 and the fourth transfer point being connected to the +150 v. DC source through a neon tube 539. Thus, the neon tubes 538 and 539 indicate at which point the double pole, double throw switch 535 is located since the switch 535 contacts the first and third points at the same time and the second and fourth points at the same time.

The common point of switch 81–11 is connected to the common bus 80 and the transfer point of the switch 81–11 is connected to relay coil L5 through the switch L6$_2$, the wire 89 and the diode 90. The relay coils L3 and L4 are also connected to the transfer point of the switch 81–11 through the switch L2, the wire 89 and diode 91. Thus, it will be seen that closure of the switch 81–11 will energize the relay coils L3, L4 and L5.

Switch 81–12 is also connected to the common bus 80 at its common point and to the relay coil L2, L6 and L7 at its transfer point through a normally open switch L4$_2$, a normaly close switch L7$_2$, a wire 66, a normally open switch L2$_2$ and a diode 68. Thus, it will be seen that closure of the switch 81–12 and the other associated switches L4$_2$ and L2$_2$ connecting the switch 81–12 to the relay coils L2, L6 and L7 will energize the coils L2, L6 and L7.

Switch 81–9 is connected to ground at its common point, and at its transfer point is connected to the grid of a pentode tube 92 which is maintained at −49 v. DC when the switch 81–9 is in its normally open position. Closure of switch 81–9 connects the grid of the pentode tube 92 to ground which places the grid of the pentode tube 92 at zero volts potential and fires the tube 92. To prevent a large current from flowing through those other portions of the circuit at −49 volts, a resistor 83 having a very high resistance is interposed in wire 540 connecting the grid of the pentode tube 92 with the −49 v. DC source. The firing of the tube 92 connects one side of the relay coil L10 to ground. This serves to energize the relay coil L10 since its other side is connected to a +150 v. DC source. Thus, it will be seen that closure of the switch 81–9 serves to energize the coil L10 by firing the tube 92.

The common point of switch 81–10 is connected to ground 78 through the wire 541 and the diode 542 and the transfer point of the switch 81–10 is connected to the interposer magnet 88–12 and to ground 65 through the switch P5 and the diode 109. Thus, closure of the switch 81–10 energizes the interposer magnet 88–12 since its other side is connected to a +150 v. DC source.

It should be pointed out here that switches 81–1 to 81–12 are those switches associated with the starwheels 81 which are in turn associated with the rear program drum 84. Also, switches 87–2 and 87–3 are associated with the starwheels 87 which are in turn associated with the front program drum 82.

The common point of the switches 87–2 and 87–3 are connected to a common bus 543 which is in turn connected to ground 95. The transfer point of the switch 87–2 is connected to the relay coil L9 and serves to ground the relay coil L9 upon closing of the switch 87–2. This serves to energize the relay coil L9 since its other side is connected to a −49 v. DC source.

The transfer point of the switch 87–3 is connected to the grid of a pentode tube 527 and serves to ground the grid of the pentode tube 527 to ground 95. This fires the tube 527 by maintaining a zero volt potential in the grid of the pentode tube 527 instead of the −49 v. DC normally maintained in the grid. This −49 v. DC normally maintained in the grid of the tube 527 is sufficient to prevent the tube 527 from firing, but when the zero volt potential is imposed in the grid of the tube 527, it is sufficient to fire the tube. When the tube 527 fires, it energizes a relay coil L13 and a relay coil L14 connected to a +150 v. DC source on their one side by grounding their other side. In order that the zero volt potential be not imposed across other portions of the circuit associated with the −49 v. DC source, a resistor 528 having an extremely high resistance is interposed in the wire 544 connecting the grid of the pentode tube 527 to the −49 v. DC source.

When the switches $L12_{1-12}$ and $L14_{2-3}$ are in their transferred position, they connect wires P1–14 to the switches $L10_{1-7}$. Thus, when the switches $L10_{1-7}$ are in their normal position and the switches $L13_{1-12}$ and $L14_{2-3}$ are in their transferred position, the wires Q1, Q3, Q5, Q7, Q9, Q11 and Q13 are connected respectively to the switches 81–1 to 81–7; and when the switches $L10_{1-7}$ are in their transferred position and the switches $L13_{1-12}$ and $L14_{2-3}$ are in their transferred position, the wires Q2, Q4, Q6, Q8, Q10, Q12 and Q14 are connected respectively to the switches 81–1 to 81–7.

The wires Q1–14 are connected to terminals T1–14 respectively. The terminals T1–14 are the input terminals to the plugboard 526 and serve to connect the starwheel switches 81–1 to 81–7 to wires RC1–11 associated with the storage unit 521.

When the switches $L13_{1-12}$ and $L14_{2-3}$ are in their normal position, they connect wires C1–9 to the switches $L10_{1-7}$. Thus, when the switches $L10_{1-7}$ are in their normal position and the switches $L13_{1-12}$ and $L14_{2-3}$ are in their normal positions, the wires C1, C3, C5, C7 and C9 are connected respectively to the switches 81–1 to 81–5; and when the switches $L10_{1-7}$ are in their transferred position and the switches $L13_{1-12}$ and $L14_{2-3}$ are in their normal position, the wires C2, C4, C6 and C8 are connected to the switches 81–1 to 81–5. It should be seen from the above that, when the switches $L13_{1-12}$ and $L14_{2-3}$ are in their normal position, the invention operates as set forth in the hereinbefore mentioned co-pending application.

Figure 7:
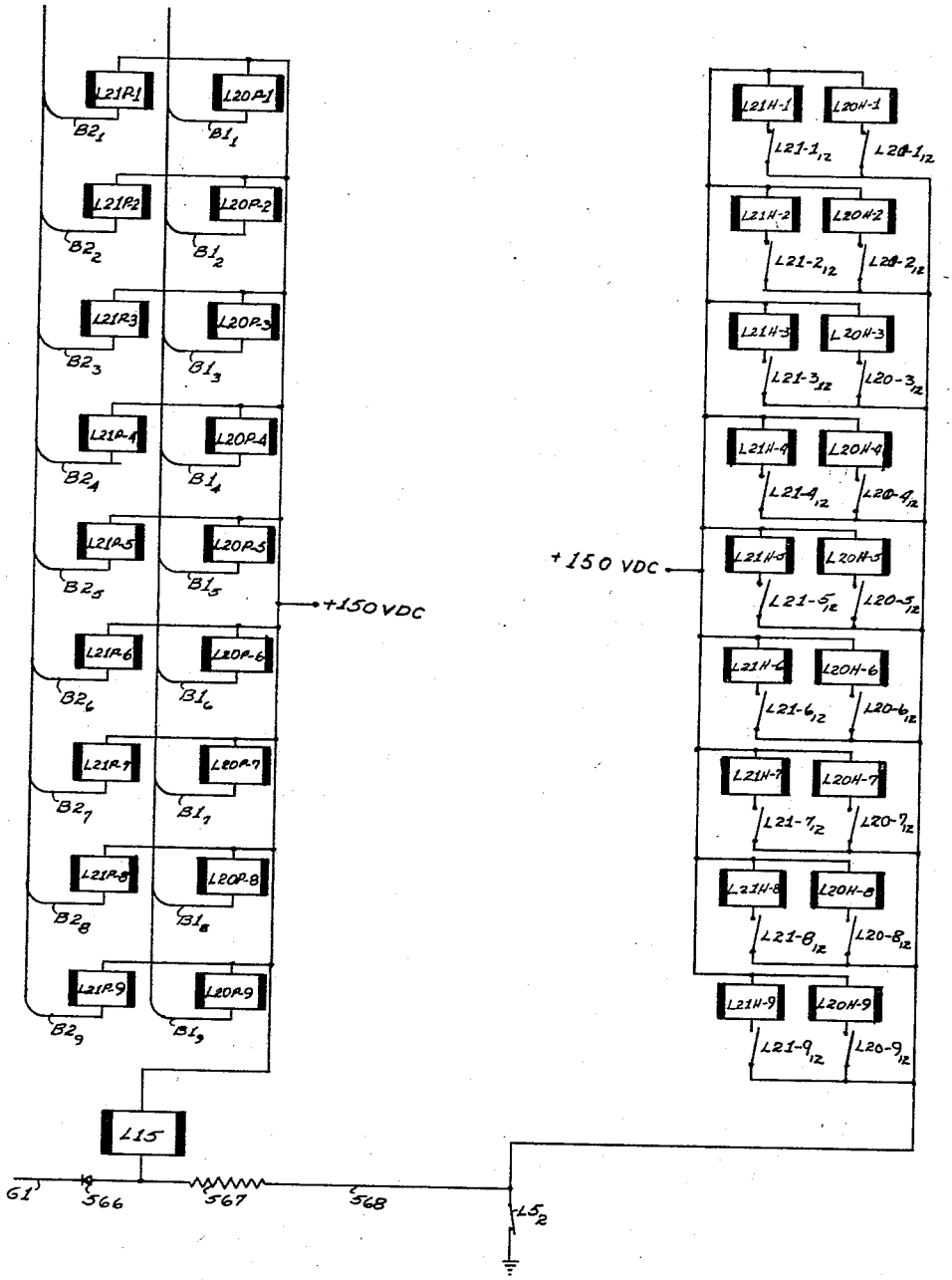
FIG. 7 is a wiring diagram showing the storage unit of the explosion unit of the invention.
Figure 8:
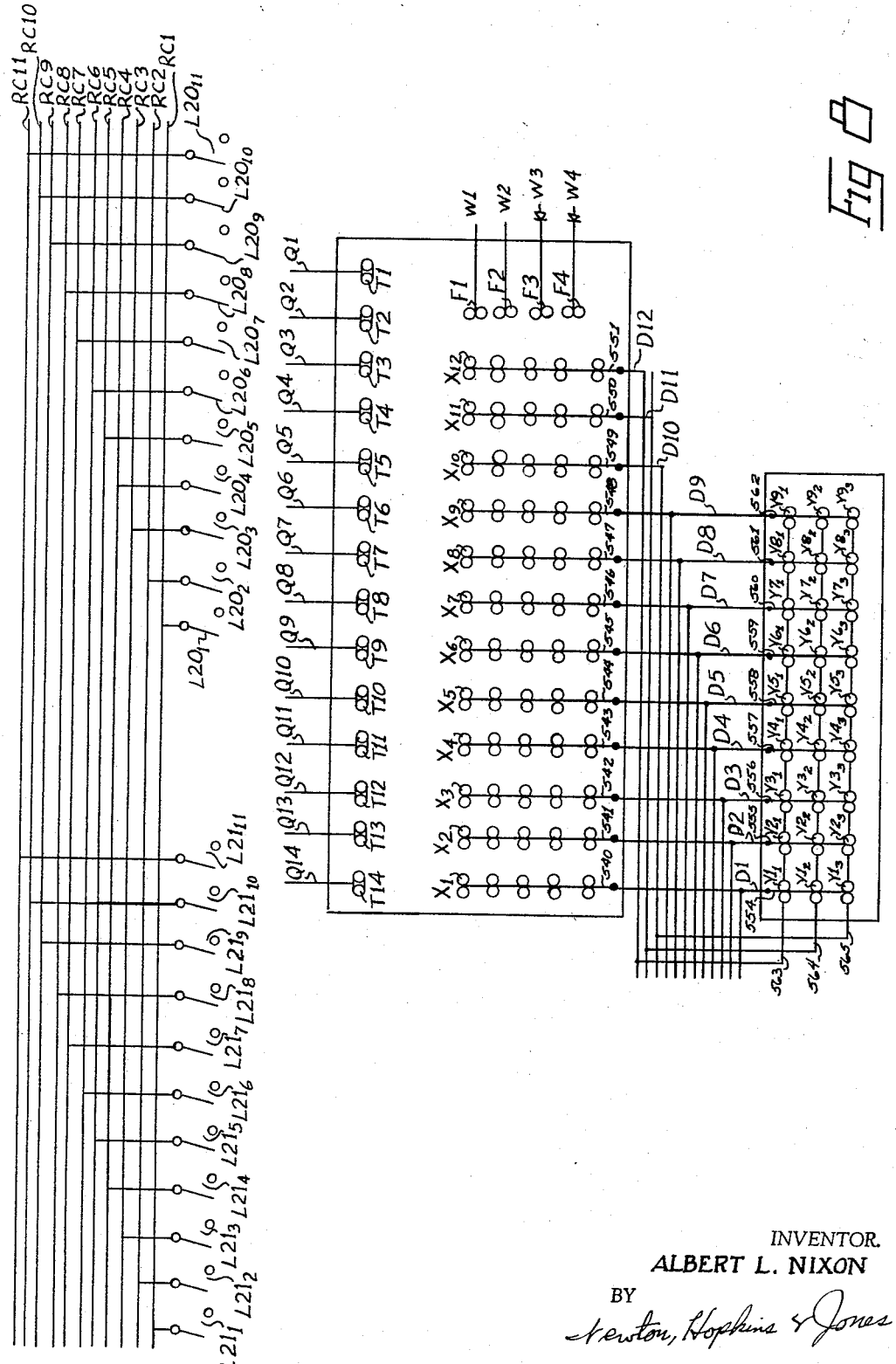
FIG. 8 is a wiring diagram showing the plugboard and the terminals for the connection of the plugboard to other portions of the circuitry of the invention.

Referring to FIG. 7 of the drawings, it will be seen that the wires $B1_{1-9}$ are connected respectively to one side of relay pick coils L20P–1 to L20P–9 and that the other side of the relay pick coils L20P–1 to L20P–9 are connected to a +150 v. DC source. Therefore, when one of the wires $B1_{1-9}$ is connected to ground, the relay pick coil L20P associated with that particular wire B1 will be energized. It will also be seen that the wires $B2_{1-9}$ are connected to one side of relay pick coils L21P–1 to L21P–9, respectively, and that the other side of the relay pick coils L21P–1 to L21P–9 are connected to a +150 v. DC source. It will thus be seen that grounding of one of the wires B2 will energize that particular relay pick coil L21P associated with the grounded wire B2. Associated with each of the relay pick coils L20P and L21P are twelve switches which are transferred by energization of the relay pick coils L20P and L21P. For simplicity, only two sets of these switches are shown. As seen in FIG. 8, switches $L21-1_{1-11}$ associated with the pick coil L21P–1 and switches $L20-1_{1-11}$ associated with the pick coil L20P–1 are shown. The switches $L21-1_1$ and $L20-1_1$ are connected in parallel through the wire RC1. The switches $L21-1_2$ and $L20-1_2$ are also connected in parallel by the wire RC2. In like manner, the switches $L21-1_{3-11}$ and $L20-1_{3-11}$ are connected in parallel respectively by the wires RS3–11. Therefore it will be seen that the switches $L21-1_{1-11}$ are connected in parallel to switches $L20-1_{1-11}$. The corresponding contacts of all the switches associated with pick coils L20P and P21P are similarly connected in parallel by wires RC1–11. Thus, all of the switches associated with the relay coils L20P and L21P are connected in parallel.

The wires RC1–11 are connected respectively to terminals T1–11, and also connected to terminals T1–11 are the wires P1–11. Connected to terminals T12–14 respectively are the wires P12–14. The wires P1–14 are those wires connected to the transfer point of the switches $L13_{1-12}$ and $L14_{2-3}$ of the circuit of the selector 520. Thus, the wires RC1–11 are connected respectively to the transfer point of the switches $L13_{1-11}$.

The switches $L20-1_{12}$ to $L20-9_{12}$ are connected respectively to one side of relay holding coil L20H–1 to L20H–9. Switches $L21-1_{12}$ to $L21-9_{12}$ are connected to relay holding coil L20H–1 to L20H–9 respectively. These switches and their associated holding coils L20H and L21H form the holding circuit for the storage unit 521 of the invention. Thus, when the relay pick coils L20P and L21P are energized through the switches N, those storage relays energized are held by the holding circuit just described so that the switches associated with the storage relays energized remain in their transferred position until the circuit is broken to the hold circuit. It is to be understood that each of the several rows of storage relays have pick coils such as L20P and hold coils such as L20H, and are connected in parallel as hereinbefore described.

The plugboard 526 is of standard type and has a numeric portion 526a and an alphic portion 526b. A plurality of terminals X1 are arranged in a row on the numeric portion 526a of the pluboard 526 and are connected to a common bus 540. Likewise, a plurality of terminals X2 are connected to a common bus 541 and arranged in a row. Moreover, a plurality of rows of terminals X3–12 are arranged in rows and are connected respectively to common busses 542–551. Connected respectively to the busses 540–551 are wires D1–12 which are in turn connected respectively to interposer magnets 88–1 to 88–12. But first, it will be seen that connecting the terminals X1–12 to ground will connect their associated interposer magnets 88 to ground and serve to energize the interposer magnets 88. Thus, a card 9 in the keypunch 15 will be punched by the energization of the interposer magnets 88. Those terminals X1 represent the digit 1, terminals X2 represent the digit 2, and in like manner those terminals X3–10 represent the digits 3 to 10 or 0. The terminals X11 represent negative numbers in combination with the other digit terminals X1–10 and, the terminals X12 represent the reject which may be punched into card 9. Terminals F1–F4 in the plugboard 526 represent respectively reset, alternate program, duplicate and skip. Wires W1–4 are connected respectively to terminals F1–4. The wire W1 is connected to the reset circuit in keypunch 15 so that the reset can be programmed into the storage. The wire W2 is connected to the alternate program button in the keypunch 15 as indicated in FIG. 5. The wire W3 is connected to diode 545 to the duplicate circuitry in the keypunch 15 so that the diode 545 prevents electrical pulses from the keypunch 15 to the terminal F3 while at the same time permitting an electrical pulse to go from the terminal F3 through the diode 545 to the keypunch 15. The wire W4 is connected by diode 546 to the skip circuit of the keypunch 15 in such manner as to prevent electrical pulses from travelling from the keypunch 15 to terminal F4 while permitting an electrical impulse to travel from the terminal F4 to the keypunch 15. Therefore, it will be seen that any desired function may be programmed into the invention since all of the functions are programmed both in the data coupler 12 and in the explosion unit 512.

Referring now to the alpha portion 526b of plugboard 526, it will be seen that a plurality of rows of terminals are designated by the letter Y. Y1 designates the first row of terminals, Y2 designates the second row of terminals, and Y3–9 designate the third through ninth row of terminals. Terminals $Y1_1$ to $Y9_2$ represent respectively the alpha characters A–I, and $Y1_2$ to $Y9_2$ represent respectively the alpha characters I to R, while the terminals $Y1_3$ to $Y8_3$ represent respectively the alpha characters S to Z. All the terminals Y1 are connected to the wire D1 by common bus 554, the terminals Y2 are connected to the wire D2 by common bus 555, and the terminals Y3–9 are connected respectively to terminals D3–9 by the common busses 556 to 562. Connecting terminals $Y1_1$ to $Y9_1$ is a common bus 563 which in turn connects the terminals $Y1_1$ to $Y9_1$ to the wire D12. Connecting terminals $Y1_2$ to $Y9_2$ is a common bus 564 which connects the terminals $Y1_2$ to $Y9_2$ to the wire D11, and connecting the terminals $Y1_3$ to $Y9_3$ is a common bus 565 which connects the terminals $Y1_3$ to $Y9_3$ to the wire D10. Therefore, it will be seen that since the wires D are connected directly to interposer magnets 88, that one punch in the card 9 may represent a digit, and two punches in the card 9 may represent an alpha character.

The plugboard 526 is wired by a plug wire 528 to the desired transfer point of the switches of a particular relay L20 or L21, and to a selected terminal X1–10 or Y1–9. This allows that particular numeric character or alpha character associated with the terminal X1–9 or Y1–9 to be punched into the card 9 when a signal is received through the plugwire 528 from the switch associated with the relay L20 or L21.

*Storage by-pass circuit*

In order that the storage unit 521 will be by-passed if no information is selected from storage when the adder 510 is cycled, although there may be a hole in a program card 83 on the front program drum 82 which causes the switch 87–3 to be activated and the explosion unit 512 to select a signal output from the storage unit 521 instead of the signal output from the commutator 86, a wire G1 connected to the first point of the switch N2 is connected to one side of a relay coil L15 through diode 566. Also connected to the same side of the relay coil L15 is a wire 568 having a resistor 567 therein which is in turn connected to ground through the switch $L5_2$. The resistor 567 is of such resistance as to allow enough current to pass through the relay coil L15 to hold it once it is picked but prevent sufficient current to pass through the coil L15 to pick the coil L15. Since the other side of the coil L15 is connected to a +150 v. DC source, grounding one side of the relay coil L15 through the switches N the wire G1 causes the relay coil L15 to be picked or energized. After the signal is received from the switches N1 and N2 which picks coil L15, the current flow through the relay coil L15 permitted by the resistor 567 is sufficient to hold the coil L15 picked. This opens the normally closed switch $L15_1$ and closes the normally open switch $L15_2$. The opening of the switch $L15_1$ removes the zero potential from the grid of the pentode tube 527 so that the relay coils L13 and L14 are de-energized. This causes the storage unit 521 to be dropped. The closing of the switch $L15_2$ connects the relay coil L5 to ground thereby energizing it and causing the invention to be reset as will be explained later.

*Indicator light circuit*

A plurality of neon tubes Z1–12 are provided to indicate when a particular interposer magnet 88 is energized to punch the card 9. One side of the neon tubes Z1–12 are connected to a +150 v. DC source through a common bus 569 and the other side of the neon tubes Z1–12 are connected respectively to the low voltage side of the interposer magnets 88–1 to 88–12. Therefore, when one of the interposer magnets 88 is energized, that associated neon tube Z will light.

*Operation*

In operation, the invention is first programmed for the particular job to be done. This is done by installing punch cards 83 and 85 on the front and rear program drums 82 and 84 in the keypunch 15. A typical program for the front program cards 83 would be as follows:

Starwheel number:
- 12 — Used for field definition; in second through last column of each field.
- 11 — Used for automatic skip.
- 10 — Used for automatic duplication.
- 1 — Used to show alpha field.
- 2 — Used as sequence check, in first column of all amount fields when programming switches are in select position.
- 3 — Used to select stored or manually imposed information.
- 4–9 — Used for alternate program.

A typical program card 85 for the rear program drum 84 would be as follows:

Starwheel number:
- 12 — Used for field definition; in second through last column of each field.
- 11 — Used to show end of field, in last column of every field.
- 10 — Used for "reject" code.
- 1 — Used to read out row 1, or row 8 in combination with starwheel 81–9.
- 2 — Used to read out row 2, or row 9 in combination with starwheel 81–9.
- 3 — Used to read out row 3, or row 10 in combination with starwheel 81–9.
- 4 — Used to read out row 4, or row 11 in combination with starwheel 81–9.
- 5 — Used to read out row 5, or row 12 in combination with starwheel 81–9.
- 6 — Used to read out row 6, or row 13 in combination with starwheel 81–9.
- 7 — Used to read out row 7, or row 14 in combination with starwheel 81–9.
- 8 — Used to overpunch 11 to show negative numbers or to show end of field.
- 9 — Used in combination with starwheels 81–1 through 81–7 to read out rows 8–14.

After the program cards 83 and 85 are installed, the programming switches PS1–6 must be set to punch the functions desired. The desired code number is programmed into the storage unit 521 by connecting the desired points of the switches $L21-1_{1-11}$ or the switches $L20-1_{1-11}$ to selected terminals X, Y or F so that the desired numeric and alpha characters are programmed to the switch $L21-1_{1-11}$ or $L20-1_{1-11}$ so that the desired code number will be punched into the card 9. For example, if the switches $L21-1_{1-11}$ were desired to be programmed to a code number 16A54BO, the switch $L21-1_1$ would be plugwired to one of the terminals X1, the switch $L21-1_2$ would be plugwired to one of the terminals X6, the switch $L21-1_3$ would be plugwired to the terminal Y1 of the alpha portion 526b, the switch $L21-1_4$ would be plugwired to one of the terminals X5, the switch $L21-1_5$ would be plugwired to one of the terminals X4, the switch $L21-1_6$ would be plugwired to the terminal $Y2_1$ in the alpha portion 526b, the switch $L21-1_7$ would be plugwired to one of the terminals X10 and the switch $L21-1_8$ would be plugwired to the terminal F3 so that the keypunch 15 will skip to the end of the field to which the explosion unit 512 is programmed.

With a card 9 registered for punching, one of the front starwheels 87 closes the switch 87–3 through the program card 83 which fires the tube 527 by placing a zero potential across its grid which serves to energize and hold the relay coils L13 and L14. This also serves to light the emit neon tube 110 to indicate that the explosion unit 512 is ready for operation. The energization of the relay coils L13 and L14 causes their associated switches $L13_{1-12}$ and $L14_{2-3}$ to be transferred which serves to connect the keypunch 15 to the storage unit 521. Thus, information will be punched into the cards 9 from the storage unit 521 rather than the commutator 86.

As an example we shall assume that the switch PS4 is transferred to that point which is connected to the common point of the switch $L9_1$. The starwheel 87 closes the switch 87–2 which serves to energize the coil L9 and transfer the switch $L9_1$ so that the common point of the switch PS4 is connected to the common bus 50. The operator then depresses the desired keys 518 for the manually imposed information to be fed to the keypunch 15, and the desired function key on the adder 510 and then depresses a key 519 having the desired code thereon. For simplicity's sake we will assume that this particular key 519 is associated with the relay coils L21H–1 and L21P–1 to which we have already connected the desired terminals of the plugboard 526.

When the adder 510 cycles, the record switch 46 is momentarily closed which serves to energize the relay coils L2, L6 and L7 through the switch 35, the switch PS4, the common bus 50 and along the wire 51 to energize relay coil L2, as well as to energize relay coils L6 and L7. The energizing of relay coil L7 opens switch $L7_1$, locks the adder 510; and the energizing of coil L2 closes switch $L2_1$, which completes the hold circuit to relays L2, L6 and L7 and also cycles punch clutch 64 through wire 61. The cycling of the punch clutch 64 closes switch P5, sending current through wire 66, switch $L2_2$ to hold relay coils L2, L6 and L7 and to diode 69 to energize relay coils L3 and L4. When coil L3 is energized, switch $L3_1$ is transferred, breaking the previously described hold circuit. The current from switch P5 will activate the alternate program if the wire W2 is connected to a terminal T1–14. However, if the alternate program has not been selected, relay coils L3 and L4 will be held through the switches $L3_1$ and $L5_1$, while relay coils L2, L6 and L7 will be de-energized. Current will now flow from ground 78 through switches $L6_1$ and $L4_1$ to the common bus 80 of the rear starwheels 81. One of the starwheels 81 (depending on the programming) will read a hole, allowing current to go through the appropriate starwheel switch 81 to one of the switches $L10_1$ through $L10_7$.

If the switch 81–9 associated with one of the starwheels 81 reads a hole in the program card 85, the relay coil L10 will be energized, and the current through the switch 81–9 will flow through the transfer point of one of the contacts $L10_1$–$L10_7$; but, if the starwheel switch 81–9 reads a blank, the relay coil L10 will not be energized, and the current will flow through the normal point thereof. In actual operation, the card 85 will be programmed so that the switch 81–9 will remain open until the first seven rows of the input information is read and then, will be closed so that L10 will be energized to cause the second seven rows of information to be read. Therefore, fourteen rows of information may be read through seven switches.

With the selecting of the desired relay in the storage unit 521, the switches $L21$–$1_{1-11}$ will be positioned properly to give the code number associated with the key 519 depressed on the adder 510. Current will then flow from ground 78, through bus 80, the switches 81–1 through 12 that are closed, the switches $L10_{1-7}$, the switches $L13_{1-12}$ and $L14_{2-3}$ that are connected to the common bus 80, through switches $L10_{1-7}$ and the plugboard 526 wired to the selector circuit through the wires P1–14. Current then flows from the terminals of the plugboard 526 through the wires RC1–11 to the switches $L121$–$1_{1-11}$ and from their transfer points to those terminals of the plugboard 526 plugwired to the transfer points of the switches $L121$–$1_{1-11}$ to the appropriate interposer magnet 88. This serves to punch the code number into the card 9 in the keypunch 15.

After the interposer magnets 88 have been energized and the keypunch 15 has moved the card 9 ahead to the next column, the keypunch 15 will cycle the punch clutch 64. With the card now in the second column of the punched field, the starwheel switch 81–12 will read a hole (see program for rear drum program card 85) and some other starwheel 81 will read a hole. This allows current to flow from switch P5, through wire 70, switch $L7_2$, switch $L4_2$, starwheel switch 81–12 to the common bus 80, and out one of the starwheel contacts 81–1 to 81–7, again going through one of the switches L10, to $L10_7$ through the plugboard 526 and one of the switches $L21$–$1_{1-11}$ of the storage unit 521 to the appropriate interposer magnet 88. The operation will continue through a punching field of card 85 until a skip or other function is reached which causes the keypunch 15 to skip to the end of that particular field.

When the keypunch 15 has skipped to the end of the field, the program drum 82 is in a position such that the switch 87–3 is now open. This serves to switch off the explosion unit 512 and allows the switches $L13_{1-12}$ and $L14_{2-3}$ to return to the normal position and connect the wires C1–9 to the keypunch 15 just as described in the co-pending application. The current from one of the wires C1–9 through appropriate switches A1–9, and out of lines R1–10 to pick the proper interposer magnet and cause the card 9 to be punched with the desired manually imposed information.

After the interposer magnets 88 have been energized and the keypunch 15 has moved the card 9 ahead to the next column, the keypunch 15 will cycle the punch clutch 64. With the card now in the second column of the punched field, the starwheel switch 81–12 will read a hole (see program for rear drum program card 85) and some other starwheel 81 will read a hole. This allows current to flow from switch P5, through wire 70, contact $L71_2$, contact $L4_2$, starwheels switch 81–12 to the common bus 80, and out one of the starwheel switches 81–1 to 81–7, again going through one of switches $L10_1$ to $L10_7$ through the commutator 86 to the appropriate interposer magnet 88. The operation will continue through a punching field of card 85 until the last column of the punching field starwheel switch 81–11 detects a hole and hence makes a circuit by wire 89 to energize relay coil L5 and to hold relay coils L3 and L4. At the end of the impulse from switch P5, relay coils L3 and L4 will be dropped. Coil L5, however, will hold through switches $L3_1$ and $L5_1$ until coil L3 is dropped, thus assuring that coil L3 is de-energized before coil L5. The present invention is now ready for another operation.

If other functions of the invention are selected, the operation is the same as described in the co-pending application. It should again be emphasized, that since the data coupler 12 remains the same as in the co-pending application, all of its functions are incorporated into the present invention and increases its versatility, however, to prevent the reading of unnecessary repetitious material this portion of the operation and those components which are common with those of the present invention are omitted.

It will be obvious to those skilled in the art that many variations may be made in the embodiments chosen for the purpose of illustrating the present invention without departing from the scope thereof as defined by the appended claims.

What is claimed as invention is:

1. In data processing apparatus including an adder having a first plurality of switches for entering information into said adder, and a card punching machine for punching information into a card, the combination therewith of a plurality of means for storing information, a second plurality of switches on said adder, each of said second plurality of switches being electrically connected to one of said plurality of means for storing information, first circuit means for connecting said first plurality of switches to said card punching machine, second circuit means for connecting said plurality of means for storing information to said card punching machine, selector means for selectively energizing said first circuit means and said second circuit means, said second plurality of switches being adapted to connect one of said plurality of means for storing information into said second circuit means.

2. Data processing apparatus comprising an adding machine having a first plurality of keys and switches associated therewith, a second plurality of keys and switches associated therewith, and means for cycling said adding machine; a keypunch having a plurality of interposer magnets and a voltage source; a coupling device controliably connecting said interposer magnets to said switches of said adding machine; and an explosion device having a plurality of storage means, selector means for selectively connecting said voltage source through one of said storage means and through said switches of said adding machine to said interposer magnets whereby certain of said interposer magnets are energized in accordance with the position of said switches associated with said first plurality of keys, and certain of said interposer magnets are energized in accordance with said storage means and said switches associated with said second plurality of keys.

3. In data processing apparatus including: an adding machine having a plurality of keys having switches associated therewith and operable thereby and means for cycling said adding machine; a keypunch machine having a plurality of interposer magnets for determining the location of holes to be punched into a card in said keypunch machine and a voltage source; and a coupling device for allowing said interposer magnets to be controlled by said switches of said adding machine; the combination therewith of; a plurality of means for storing information, selector means for selectively connecting said voltage source through one of said means for storing information and through said switches of said adding machine to said interposer magnets, whereby certain of said interposer magnets are energized in accordance with the position of said switches of said adding machine, and certain of said interposer magnets are energized in accordance with information in said means for storing information.

4. In a data processing apparatus including: an adding machine having a plurality of keys having switches associated therewith and operable thereby and means for cycling said adding machine; a keypunch machine having a plurality of interposer magnets for determining the location of holes to be punched into a card in said keypunch machine and a voltage source; and a coupling device for allowing said interposer magnets to be controlled by said switches of said adding machine; the combination therewith of a plurality of means for storing information, first means for selecting one of said means for storing information, second means for selectively connecting said voltage source through said one of said selected first means to said interposer magnets and for selectively connecting said voltage source through said switches of said adding machine to said interposer magnets.

5. In data processing apparatus including: an adding machine having a plurality of keys having switches associated therewith and operable thereby and means for cycling said adding machine; a keypunch having a plurality of interposer magnets for determining the location of holes to be punched into a card in said keypunch, programming means and a voltage source; a coupling device for allowing said interposer magnets to be controlled by said switches of said adding machine; the combination therewith of; a plurality of means for storing information, a second plurality of keys on said adding machine having a second plurality of switches associated therewith and operable thereby, each of said second plurality of switches being connected in series with one of said plurality of means for storing information whereby each of said second plurality of switches will select one of said plurality of means for storing information; selector means controlled by said programming means for said key punch, said selector means selectively connecting said voltage source through said one of said plurality of means for storing information to selected interposer magnets and through said first plurality of switches of said adding machine to selected interposer magnets.

6. In data processing apparatus including: an adding machine having a plurality of keys having switches associated therewith and operable thereby and means for cycling said adding machine; a keypunch having a plurality of interposer magnets for determining the location of holes to be punched into a card in said keypunch, programming means and a voltage source; a coupling device for allowing said interposer magnets to be controlled by said switches of said adding machine, the combination therewith of; a plurality of means for storing information, said means comprising a plurality of storage relays having a plurality of switches connected therewith, a second plurality of keys on said adding machine having a second plurality of switches associated therewith and operable thereby whereby each of said second plurality of switches will select one of said plurality of storage relays when the said second plurality of keys are manipulated; selector means controlled by said programming means of said keypunch, said selector means comprising a vacuum tube and a plurality of relays having relay coils and a plurality of associated switches, said relay coils connected in series with said vacuum tube, means for actuating said vacuum tube by said programming means of said keypunch, means for connecting said switches selectively to said storage relays and to said adding machine so that said selector means selectively connects said voltage source through said one of said plurality of means of said plurality of storage relays to selected interposer magnets and through said first plurality of switches of said adding machine to selected interposer magnets.

7. Data processing apparatus comprising an adding machine having a first plurality of keys, a first plurality of switches associated with said first plurality of keys and operable thereby, a second plurality of keys, a second plurality of switches associated with said second plurality of keys and operable thereby and means for cycling said adding machine; a keypunch having a card therein, a plurality of interposer magnets for determining the location of hole to be punched into the card, program means and a voltage source; a coupling device having a plurality of relay means and a plurality of programming switches, said relay means and said programming switches determining the sequence by which the voltage source in said keypunch will be connected to said interposer magnets through said first and second plurality of switches; and an explosion unit having a plurality of means for storing information, said means for storing information connected in series with said second plurality of switches of said adding machine whereby each of said second plurality of switches will select one of said plurality of means for storing information, selector means controlled by said programming means of said keypunch, said selector means selectively connecting said voltage source through said one of said plurality of means for storing information to said interposer magnets and through said first plurality of switches of said adding machine to said interposer magnets.

8. Data processing apparatus comprising an adding machine having a first plurality of keys, a first plurality of switches associated with said first plurality of keys and operable thereby, a second plurality of keys, a second plurality of switches associated with said second plurality of keys and operable thereby and means for cycling said adding machine; a keypunch having a card therein, a plurality of interposer magnets for determining the location of hole to be punched into the card, program means and a voltage source; a coupling device having a plurality of relay means and a plurality of programming switches, said relay means and said programming switches determining the sequence by which the voltage source in said keypunch will be connected to said interposer magnets through said first and second plurality of switches; and an explosion unit having a plurality of means for storing information, said means comprising a plurality of storage relays connected to said second plurality of switches on said adding machine and operable thereby whereby each of said second plurality of switches will select one of said plurality of storage relays when the said second plurality of keys are manipulated; and selector means controlled by said programming means of said keypunch, said selector means comprising a vacuum tube and a plurality of relays having relay coils and a plurality of associated switches, said relay coils connected in series with said vacuum tube, means for actuating said vacuum tube by said programming means of said keypunch, means for connecting said switches selectively to said storage relays and to said adding machine so that said selector means selectively connects said voltage source through said one of said plurality of means of said plurality of storage relays to selected interposer magnets and through said first plurality of switches of said adding machine to selected interposer magnets.

9. Data processing apparatus comprising an adding machine having a first plurality of keys, a first plurality of switches associated with said first plurality of keys and operable thereby, a second plurality of keys, a second plurality of switches associated with said second plurality of keys and operable thereby and means for cycling said adding machine; a keypunch having a card therein, a plurality of interposer magnets for determining the location of hole to be punched into the card, program means and a voltage source; a coupling device having a plurality of relay means and a plurality of programming switches, said relay means and said programming switches determining the sequence by which the voltage source in said keypunch will be connected to said interposer magnets through said first and second plurality of switches; and an explosion unit having a plurality of means for storing information, said means comprising a plurality of storage relays connected to said second plurality of switches on said adding machine whereby each of said second plurality of switches will select one of said plurality of storage relays when the said second plurality of keys are manipulated; selector means controlled by said programming means of said keypunch, said selector means comprising a vacuum tube and a plurality of relays having relay coils and a plurality of associated switches, said relay coils connected in series with said vacuum tube, means for actuating said vacuum tube by said programming means of said keypunch, means for connecting said switches selectively to said storage relays and to said adding machine so that said selector means selectively connects said voltage source through said one of said plurality of means of said plurality of storage relays to selected interposer magnets and through said first plurality of switches of said adding machine to selected interposer magnets; and means for controlling said selector means extraneous of said programming means, said means comprising a relay coil and its associated switch which connect the first plurality of switches to selected interposer magnets even though said programming means seeks to connect said storage relays to selected interposer magnets if said second plurality of keys remain in their normal position.

References Cited
UNITED STATES PATENTS

| | | | |
|---|---|---|---|
| 2,424,097 | 7/1947 | Johnson | 234—17 X |
| 2,905,244 | 9/1959 | Sonnanstine | 234—124 X |
| 2,998,914 | 9/1961 | Thomas et al. | 234—54 X |

WILLIAM W. DYER, JR., *Primary Examiner.*